US005927056A

United States Patent [19]

Renehan

[11] Patent Number: 5,927,056

[45] Date of Patent: Jul. 27, 1999

[54] SHAKER HEAD FOR HARVESTER

[75] Inventor: Desmond Lawrence Renehan, Melbourne, Australia

[73] Assignee: Enviro Research International Pty. Ltd.

[21] Appl. No.: 08/929,606

[22] Filed: Sep. 15, 1997

[30] Foreign Application Priority Data

Sep. 16, 1996 [AU] Australia ..................................... 2316

[51] Int. Cl.[6] .................................................... A01D 46/26

[52] U.S. Cl. ............................................................ 56/340.1

[58] Field of Search ................................... 56/340.1, 329, 56/327.1, 328.1

[56] References Cited

U.S. PATENT DOCUMENTS 2,714,281 8/1955 Steele .
3,407,582 10/1968 Poehlmann .
3,505,801 4/1970 Nye .
3,596,455 8/1971 Adrian .
3,623,308 11/1971 Nye .
3,667,797 6/1972 Kilby ................................ 56/340.1 X
4,545,187 10/1985 Landgraf .
5,123,238 6/1992 Renehan ................................... 56/329

*Primary Examiner*—Terry Lee Melius
*Attorney, Agent, or Firm*—Kane, Dalsimer, Sullivan, Kurucz, Levy, Eisele and Richard, LLP

[57] ABSTRACT

A shaker head for a harvester of plant produce comprises jaws 1, 2 pivotally connected together at 3 and having resilient clamp pads 6 adjacent the free ends thereof. A shaking mechanism is housed in a space in one or both jaws behind clamp pad 6. Jaws 1, 2 are operable by ram 4, 5 to grip part of a plant and, on actuation of the shaking mechanism, to shake it to jar produce therefrom. Each clamp pad 6 is provided with a plurality of bores, each bore extending from a mouth in the gripping surface of pad 6 for more than half the thickness of the pad.

6 Claims, 1 Drawing Sheet

1
9
3
6
8
9
5
4
6
2

3
11
7
12
6
3

SHAKER HEAD FOR HARVESTER

BACKGROUND OF THE INVENTION

The invention relates to a harvester for nuts, fruit, pods, cones and other crops (hereinafter generally referred to as "produce") which grow on trees, shrubs, vines and similar plants. Manual harvesting of such produce is labour intensive and costly. Accordingly, there have been prior attempts to mechanise the harvesting process for this kind of produce. In prior mechanical apparatus for that purpose, a harvester has been provided with means operable to shake the plant to jar produce therefrom. Such a harvester will be referred to as a harvester of the type described. The invention is concerned with this type of harvester and is particularly concerned with a shaker head therefor.

DESCRIPTION OF PRIOR ART

A known harvester of the type described has been used for harvesting nuts. It comprises a heavy vehicle which, for harvesting purposes, is driven to a position adjacent a tree. The vehicle carries an hydraulically operated boom which, at its free end, has a shaker head with jaws movable to grip the trunk or branch of a tree. Shaking the tree results in produce falling onto the ground. There are several disadvantages with this known harvester. As the harvester is only used for short periods during the year, this expensive piece of equipment lies idle most of the time. As the heavy vehicle moves close to a tree, it may compact the earth near the tree and possibly damage the root system of the tree. Clearing the ground of fallen nuts often results in destruction of, or damage to, the mulch and compatible plant and insect life existing beneath the tree.

I have previously proposed a harvester of the type described to overcome those disadvantages. As described in my Australian Patent No.639,530 (U.S. Pat. No. 5,123,238), the harvester is formed as a unit which may be carried by a standard tractor which may also serve as a power source for the harvester. At one end, the unit may be detachably connected to the three point linkage of the tractor to extend longitudinally thereof. A shaker head is mounted adjacent to the opposite or free end of the unit. The shaker head comprises a shaking mechanism and associated jaws extending beyond the free end of the unit and operable to grip part of the plant and to shake it to jar produce therefrom. In one form, the unit may be an hydraulically operated boom which is operable to position the jaws adjacent the part of the plant to be gripped. The unit may include other features such as a conveyor. As described in my earlier patent, the unit may also include a foldable catching portion which is movable from a closed position to a catching position surrounding the trunk of the plant held between the jaws of the shaker head.

There are several existing mechanical tree shakers. They are large, heavy and bulky. The shaker head comprising the shaking mechanism and associated jaws has been fabricated from steel plate having a thickness of 10–12 mm with the result that the shaker head tended to be heavy, weighing around 1000 kg. Such a heavy shaker head requires heavy support means. In addition, the bulk of known shaker heads causes access difficulties to the part of the plant to be gripped, at least in the case of some plants such as olive trees. As described in my prior patent, a shaking mechanism is mounted on one of the jaws near the gripping end thereof. In use, there is a tendency for the housing of the shaker mechanism to become entangled with the foliage of the plant, often resulting in damage to the plant.

Most existing shaker heads are able to provide a variety of shake patterns arranged by changing out-of-balance weights and drive sprocket speeds. Some use two sets of separate belts which can cause varying shake patterns which are random and uncontrolled. The varying of shake sequences has been claimed to enhance produce removal. However, the multidirectional thrusting of out-of-balance weights has been shown to cause twisting of the clamp pads on the tree trunk resulting in heat generation (up to steaming) and loosening and removal of the outer protective layers of the tree trunk. It has also been shown to cause flicking outwards of the produce, thus spreading the area of collection. In addition, the root system has also been twisted or stirred, which is most undesirable. Some horticulturists claim the commercial life of some tree species, for example, cherries, is halved by this yearly trunk and root damage. The sheer bulk and weight of these shakers also causes problems when clamped to young and tender trees. To alternate the direction of shake requires considerable power, around 180 HP. It has been necessary to cover the pads with a sheet of rubber between a pad and the tree, and also necessary to provide lubrication between pad and sheet. The friction between pad and sheets has developed considerable heat which passes through the tree.

DESCRIPTION OF THE INVENTION

It is an object of the invention to provide a shaker head which may be used with little risk of damage to the plant while providing maximum produce removal.

It is another object of the invention to provide a shaker head which is lighter and is less bulky than previously has been the case.

It is a further object of the invention to provide a shaker head cabable of causing direct back and forth vibration of the part of the plant being gripped.

It is a still further object of the invention to provide shaker jaws with resilient gripping pads constructed to minimise the risk of damage to the plant.

Accordingly, it is proposed to construct a shaker head for a harvester of the type described, wherein said shaker head comprises a pair of jaws pivotally connected together adjacent one end thereof, a pair of resilient clamp pads, one of said clamp pads mounted on each jaw adjacent the free end thereof, a shaking mechanism for the jaws means operable to move the jaws to grip a part of a plant between the clamp pads and, on actuation of said shaking mechanism, to shake it to jar produce therefrom, characterized in that, each clamp pad is provided with a plurality of bores, each bore extending from a mouth in the gripping surface of the pad for more than half the thickness of the pad.

BRIEF DESCRIPTION OF THE DRAWINGS

The invention will be described in relation to the accompanying illustrations in which.

DESCRIPTION OF THE EMBODIMENT

The shaker head described herein is suitable for use in the harvester described in my Australian Patent No.639,530. It is emphasised that it is not restricted to that use but may be used in other harvesters of the type described.

Figure 3:
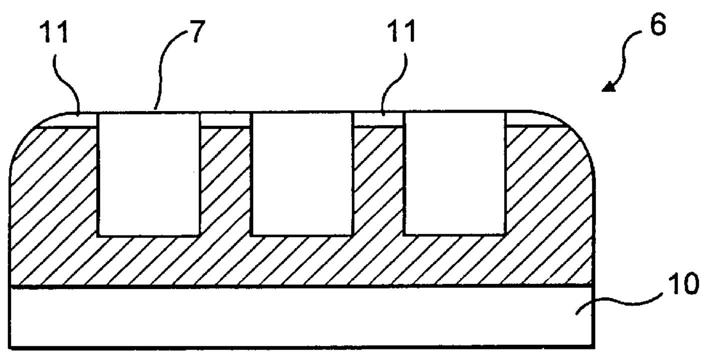
FIG. 3 is a sectional view along the line A—A of FIG. 2.

As described in my earlier patent, the shaker head may be carried at the free end of a unit with the jaws of the shaker head sending beyond the free end. The jaws are operable to grip part of the plant to shake it. The unit may be detachably mounted on the 3-point linkage of a standard tractor. By manipulating the position of the unit, the jaws may be positioned adjacent that part of the plant to be gripped. Preferably, the mounting is such that the jaws can be rotated about the longitudinal axis thereof. An example of a suitable rotatable mounting is illustrated in FIG. 3 of my previous patent. With such a rotatable mounting, it is possible to align the jaws to that part of the plant to be gripped which reduces the risk of damage to the plant.

Figure 1:
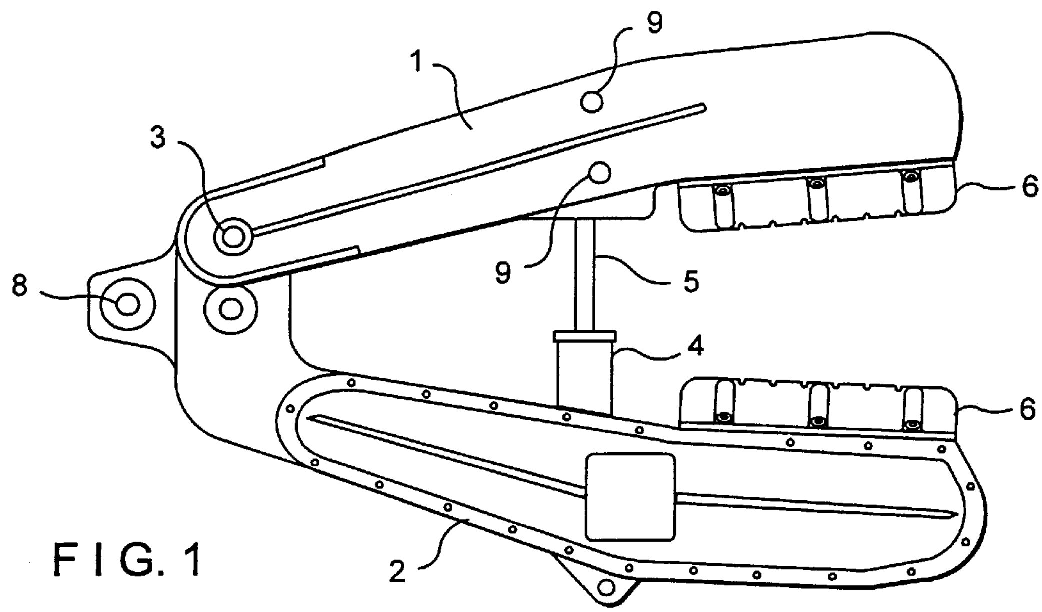
FIG. 1 is a plan view of the jaws of the shaker head according to one embodiment of the invention.

The shaker head illustrated in FIG. 1 comprises a pair of jaws 1 and 2 pivotally connected at one end by pivot pin 3. Jaws 2 may be provided with a plurality of holes to accommodate pivot pin 3 so that the pivot axis may be adjusted to cater for holes of different sizes. Only two positions for pivot pin 3 are shown in FIG. 1.

Intermediate the ends thereof, jaws 1 and 2 are connected by an hydraulic ram comprising cylinder 4 and connecting rod 5. As shown, connecting rod 5 may be connected to jaw 1 at either of two positions 9 to allow for further adjustment of the jaws to cater for trees of different sizes. Additional connecting positions may be provided if desired.

The shaker head and particularly jaws 1 and 2 are designed to minimise bulk and contoured to allow easy access to the space adjacent the trunk or other part of the plant to be gripped by the jaws. The outer body or casing of jaws 1 and 2 is made of strong lightweight material such as aluminium or alloy material such as that used for aircraft construction. It may be cast or fabricated by welding with maximum strength consistent with lightness. Other lightweight materials can be used such as ferrous alloys provided lighter gauges are selected and joined by modern high strength welding techniques. It has been possible to reduce the weight of the shaker head to approximately 200 kg (which requires shaking power of 50 HP) as compared with prior shaker heads of approximately 1000 kg (requiring 180 HP). The result is to reduce the power needed to vibrate the smaller mass while still putting equal energy into shaking the plant.

Figure 2:
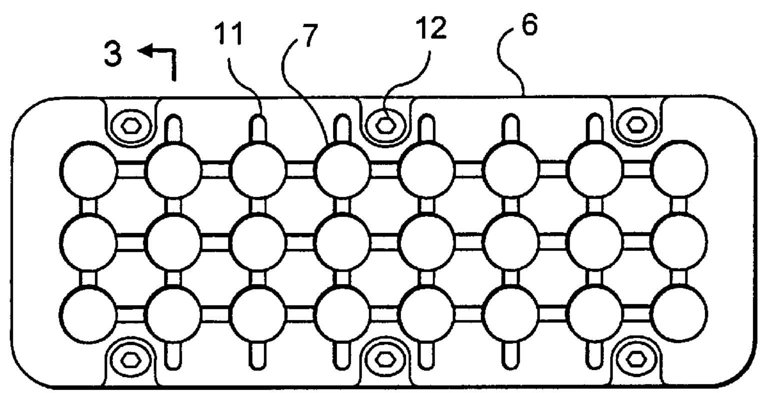
FIG. 2 is a plan view of one of the resilient gripping pads mounted adjacent the ends of the gripping jaws.

Towards the free ends of jaws 1 and 2, the adjacent surfaces are provided with resilient clamp pads 6 covering the areas of the jaws 1 and 2 which are adapted to grip the plant. The pads 6 are made substantially in the shape of a rectangular block of resilient, wear resistant plastic or rubber resilient material. As shown in FIGS. 2 and 3, each pad 6 is provided with a plurality of bores 7 extending from a mouth in the gripping surface of pad 6 towards the opposite surface for more than half the thickness of the pad. Preferably, the bore extends for 75–80% of the thickness of pad 6. On the gripping surface of pads 6 there is a grid of air slots or grooves 11 joining adjacent mouths of bores 7 with each other and the mouth of each outer bore with a peripheral edge of pads 6. On the surface of pad 6 opposite to the gripping surface, each pad 6 is provided with a metal insert 10 to facilitate detachable mounting of pad 6 on jaws 1 and 2 by means of bolts 12. The bores 7 increase the resiliency of pad 6 without materially reducing its resistance to wear. The pattern of bores 7 allows pad 6 to wrap-compress around the part of the plant to be gripped without slippage and thus reduces the possibility of damage to the plant. Air slots or grooves 11 allow free exit of trapped air as pads 6 grip the plant and as they are pulsated by the operation of the shaker. The constant inhale/exhale of air caused by vibration of the shaker cools both the pads 6 and the trunk (or other part) of the plant that is gripped between pads 6. Further, the flexing of the pad material surrounding bores 7 allows the outer faces of pads 6 to remain substantially stationary relative to the gripped surface of the trunk (or other part) of the plant. Thus, the trunk or other part of the plant is subjected to no or little friction with the result that no heat is developed. The internal flexing of pads 6 is cooled by the pulsating air.

Jaw 2 is made wider that jaw 1. Behind pad 6, jaw 2 is provided with a space in the casing housing a suitable shaking mechanism to impart vibration to pads 6 and so to the part of the plant being gripped. One suitable shaking mechanism comprises two counterrotating eccentrically mounted weight sets, the rotation of which is synchronized by gears or by sprocket and chain toothed belt or the like. Actuation of the shaking mechanism by an hydraulic motor causes the weight sets to rotate in synchronism to provide the shaking forces. Two lines of thrust occur at 180 degrees on opposite sides of the axis of rotation as the position of the weight sets meet. The shaking mechanism is positioned in the casing so that thrust is imparted to the plant along a direct line central to clamp pads 6. This action causes a direct back and forth vibration to the trunk or other part of the plant being gripped. This results in no tendency to twist the clamp pads 6 on the plant. No heat is developed and no damage is caused to the plant. After the weights pass this meeting point on either side of 180 degrees, they tend to balance out each other as they move apart. It is important that both sets of weights are of equal mass. This pure back and forth shake or vibration has been shown to avoid trunk damage. As speed is increased, the vibration changes in amplitude and intensity but not in direction. Experience has shown this to be a very efficient shake system both in produce removal and lack of tree damage. The root system of the plant receives vibrations which help aeration, but there is no twisting action on the roots.

The across the centre line vibration can be achieved by different weight locations. The weights may be mounted for rotation about one axis with an inner spindle carrying one set of weights rotating in one direction and an outer sleeve carrying another set rotating in the opposite direction. Secondly, the weights may be mounted on two parallel spindles separated sufficiently to allow the weights to rotate. One set of weights on one spindle rotates between two spaced half sets on the other spindle. Thirdly, one set of weights may be mounted in jaw 1, and the other set in jaw 2, each set on the same centre line. The degree of the shake can be altered by changing the weights in a set or the relative position of the weights in a set or changing the speed of revolution. Usually the latter course is sufficient. By making changes of this nature, the shaking mechanism may be quickly adjusted to cater for different plant sizes and for different types of plants.

In order further to reduce the risk of damage to the plant, the gripping jaws 1 and 2 are arranged to be self-centring. The jaws 1 and 2 are mounted on pivot 8 so as to be freely movable thereabout. Jaws 1 and 2 are also supported by a slide plate (not shown) which is mounted below the jaws at a convenient position intermediate the ends thereof but not encroaching on the space below the padded clamp portions of the jaws. The lower sides of the jaws are preferably provided with bearings, for example nylon bearings, to facilitate movement of jaws 1 and 2 with respect of the slide plate. The hydraulic ram 4, 5 is operable to move the jaws 1 and 2 towards one another to grip the plant between pads 6. As soon as one pad contacts the tree, movement of the corresponding jaw ceases with no or negligible pressure on the plant. Only the other jaw continues to move until the second pad contact contacts the plant. Then both jaws compress the pads to grip the plant with equal and direct to the centreline pressure. This pressure is adjustable by the driver, depending on the size and toughness of the plant species. To provide further protection, it is preferred to surround the pivot pin of pivot 8 with a flexible bush to provide resilient mounting of the jaws with respect to the pivot pin. This self-centring feature compensates for driver error in his approach to centre the plant between pads 6.

By adopting the concepts as herein described, it is possible to produce a lightweight shaker head which can be used with little likelihood of damage to the plant.

The equal, straight back and forth vibration produced by the shaker head described, with a controlled degree of shaking, results in very fast removal of produce with no tree damage and with a vertical drop and accurate catching of produce. The use of this shaker head enhances plant health by instantly clearing produce, drying leaves and twigs, etc. from the plant freeing it from energy drain and allowing for a clear build up for the next harvest. Controlled shaking can be used in the pre-harvest season to thin surplus blossom and weak produce leaving a smaller number of larger top quality produce.

I claim:

1. A shaker head for a harvester, said shaker head comprising a pair of jaws pivotally connected together adjacent one end thereof, a pair of resilient clamp pads, one of said clamp pads mounted on each jaw adjacent a free end thereof, a shaking mechanism for shaking of the jaws, means operable to move the jaws to grip a part of the plant between the clamp pads and, on actuation of said shaking mechanism, to shake it to jar produce therefrom, characterised in that, each clamp pad is provided with a plurality of bores, each bore extending from an opening in a gripping surface of the pad for more than half the thickness of the pad, wherein a grid of grooves is provided in the gripping surface of each pad, said grooves joining adjacent openings of the bores with each other and the opening of each outer bore with an peripheral edge of the pad.

2. A shaker head as claimed in claim 1, wherein each bore extends for 75–80% of the thickness of the pad.

3. A shaker head as claimed in claim 1, wherein a space is provided in one or both jaws behind the gripping pad, the shaking mechanism housed within the space(s).

4. A shaker head as claimed in claim 3, wherein the shaking mechanism is positioned to impart thrust to the plant along a direct line central to the clamp pads to cause direct back and forth vibration to the part of the plant being gripped.

5. A shaker head as claimed in claim 1, including a pivot on which the jaws are mounted to be freely movable thereabout so that, as the jaws are moved towards one another, movement of one jaw ceases when its pad contacts the plant while movement of the other jaw continues until its pad contacts the plant when both pads grip the plant with equal pressure.

6. A shaker head as claimed in claim 1, wherein the jaws are made of strong lightweight material and are contoured to allow easy access to the space adjacent the part of the plant to be gripped by the jaws.

* * * * *